United States Patent
Lee

(10) Patent No.: US 8,322,484 B2
(45) Date of Patent: Dec. 4, 2012

(54) EPS MOTOR HAVING STEERING ANGLE SENSOR

(75) Inventor: Changhwan Lee, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 13/331,836

(22) Filed: Dec. 20, 2011

(65) Prior Publication Data
US 2012/0152646 A1 Jun. 21, 2012

(30) Foreign Application Priority Data
Dec. 21, 2010 (KR) .................. 10-2010-0131595

(51) Int. Cl.
*B62D 5/04* (2006.01)
*G01B 7/30* (2006.01)
(52) U.S. Cl. .................. 180/444; 180/443; 324/207.2
(58) Field of Classification Search .................. 180/443, 180/444; 73/1.75; 250/231.13; 324/207.2; 702/151
See application file for complete search history.

(56) References Cited

U.S. PATENT DOCUMENTS

| 6,072,254 A * | 6/2000 | Heib et al. ................ 310/68 B |
| 6,374,941 B1 * | 4/2002 | Forborgen ................ 180/444 |
| 6,904,999 B2 * | 6/2005 | Kojo et al. ................ 180/422 |
| 7,448,466 B2 * | 11/2008 | Miller et al. ................ 180/444 |
| 2004/0007067 A1 * | 1/2004 | Meyer et al. ............... 73/514.31 |
| 2011/0031851 A1 * | 2/2011 | Uryu et al. ................ 310/68 B |
| 2011/0067945 A1 * | 3/2011 | Sonoda et al. ............... 180/444 |
| 2011/0068780 A1 * | 3/2011 | Sakai ...................... 324/207.25 |
| 2012/0091830 A1 * | 4/2012 | Kim et al. .................. 310/43 |
| 2012/0116717 A1 * | 5/2012 | Satou et al. ................. 702/151 |

* cited by examiner

*Primary Examiner* — Anne Marie M Boehler
(74) *Attorney, Agent, or Firm* — Saliwanchik, Lloyd & Eisenschenk

(57) ABSTRACT

Disclosed is an EPS motor having a steering angle sensor for an electronic power steering system, wherein the EPS motor includes a housing, a bracket, a rotating shaft, a stator and a rotor, and the housing includes an upper housing having the stator and the rotor in an internal space thereof, the bracket coupled to an upper portion thereof, and the rotating shaft coupled to the upper housing to protrude downwards therefrom, and a lower housing disposed under the upper housing to receive the steering angle sensor therein.

4 Claims, 3 Drawing Sheets

EPS MOTOR HAVING STEERING ANGLE SENSOR

CROSS-REFERENCE TO RELATED APPLICATION

This application claims the benefit under 35 U.S.C. §119 of Korean Patent Application No. 10-2010-0131595, filed on Dec. 21, 2010, which is hereby incorporated by reference in its entirety.

BACKGROUND OF THE INVENTION

1. Field of the Invention

The present invention relates generally to an electronic power steering system (EPS) for a vehicle and, more particularly, to an EPS motor having a steering angle sensor mounted to an electronic power steering system.

2. Description of the Related Art

Generally, an auxiliary steering system supported by additional power is used to ensure the steering stability of a vehicle. Conventionally, the auxiliary steering system uses a hydraulic pressure. However, recently, an electronic power steering system, which consumes less power and is excellent in accuracy, has been used.

Such an electronic power steering system (EPS) controls the driving of a motor by an electronic control unit (ECU) depending on driving conditions detected by a vehicle speed sensor, a torque angle sensor and a torque sensor, thus ensuring stability in cornering of a vehicle and providing a rapid restoring force, and thereby allowing a driver to safely drive the vehicle.

FIG. 1 is a schematic view showing the construction of a typical electronic power steering system.

As shown in the drawing, the electronic power steering system includes a steering wheel 10, a steering shaft 10a, an EPS motor 11, a steering angle sensor 12 and an ECU 13.

The steering wheel 10 is rotated by a driver so as to change a direction of a vehicle. The steering wheel 10 is connected to the steering shaft 10a. If the driver rotates the steering wheel 10, the steering shaft 10a rotates in the same direction as the steering wheel 10 in conjunction with the rotation of the steering wheel 10.

The EPS motor 11 is a motor that assists torque of the steering wheel 10 manipulated by a driver for steering, and enables the driver to more conveniently perform steering operation. Generally, the EPS motor 11 uses a brushless DC (BLDC) motor. The BLDC motor means a DC motor equipped with an electronic commutating device except for mechanical contact parts of the DC motor such as a brush or a commutator. A decelerator and a torque sensor (not shown) are coupled to an end of the EPS motor 11. The torque sensor detects relative rotating displacement between an input shaft and an output shaft when the steering wheel 10 rotates, generates an electric signal based on the detected result, and thereafter transmits the signal to the ECU 13.

The steering angle sensor 12 is installed at a position around the steering wheel 10, directly measures a rotating angle of the steering wheel 10 rotated by the driver's manipulation, and transmits a signal regarding the rotating angle to the ECU 13.

The ECU 13 electronically controls various drive sources of the electronic power steering system including the EPS motor 11, based on data of a vehicle speed sensor (not shown), the torque sensor and the steering angle sensor 12.

However, the electronic power steering system constructed as described above is problematic in that the steering angle sensor 12 is mounted as a separate part, so that an additional space for installing the steering angle sensor 12 must be provided around the steering wheel 10, thus causing inconvenience, and the number of assembling processes and the cost of parts are increased because of an increase in number of parts.

BRIEF SUMMARY

Accordingly, the present invention has been made keeping in mind the above problems occurring in the prior art, and an object of the present invention is to provide an EPS motor, which is improved in structure to allow a sensor capable of detecting a steering angle to be installed in a housing of the EPS motor.

In order to accomplish the above object, the present invention provides an EPS motor having a steering angle sensor for an electronic power steering system. The EPS motor includes a housing, a bracket, a rotating shaft, a stator and a rotor, and the housing comprises an upper housing including the stator and the rotor in an internal space thereof; the bracket coupled to an upper portion thereof, and the rotating shaft coupled to the upper housing to protrude downwards therefrom, and a lower housing disposed under the upper housing to receive the steering angle sensor therein.

The lower housing may take a shape of a cylinder that is open at a top thereof, and may be coupled to a bottom surface of the upper housing. A wall surface of the lower housing may be formed integrally with the upper housing, and the bottom surface of the lower housing may be coupled with the substrate.

Preferably, the steering angle sensor comprises a substrate mounted on a bottom surface of the lower housing, a worm gear formed on an outer circumference of the rotating shaft protruding from the upper housing, a worm wheel engaging with the worm gear, a first magnet member coupled to an end of the rotating shaft protruding from the upper housing, a second magnet member provided on the worm wheel, a first hall sensor provided at a position on the substrate corresponding to the first magnet member, and a second hall sensor spaced apart from the substrate by a predetermined distance and provided at a position corresponding to the second magnet member.

Preferably, when a steering wheel is constructed to turn five times in total and a reduction gear ratio of an EPS reduction gear operated in conjunction with the rotating shaft connected to the steering wheel is 15:1, a reduction gear ratio of the worm gear formed on the rotating shaft to the worm wheel is 75:1.

As apparent from the above description, according to the present invention, the steering angle sensor is integrated with the EPS motor, so that it is unnecessary to install a separate steering angle sensor, and thereby a degree of design freedom of the EPS can be increased.

Further, the removal of the steering angle sensor leads to a reduction in cost of the EPS, thus enhancing price competitiveness and profitability of a product.

DETAILED DESCRIPTION OF THE INVENTION

Hereinafter, an EPS motor having a steering angle sensor according to a preferred embodiment of the present invention will be described with reference to the accompanying drawings.

Figure 2:
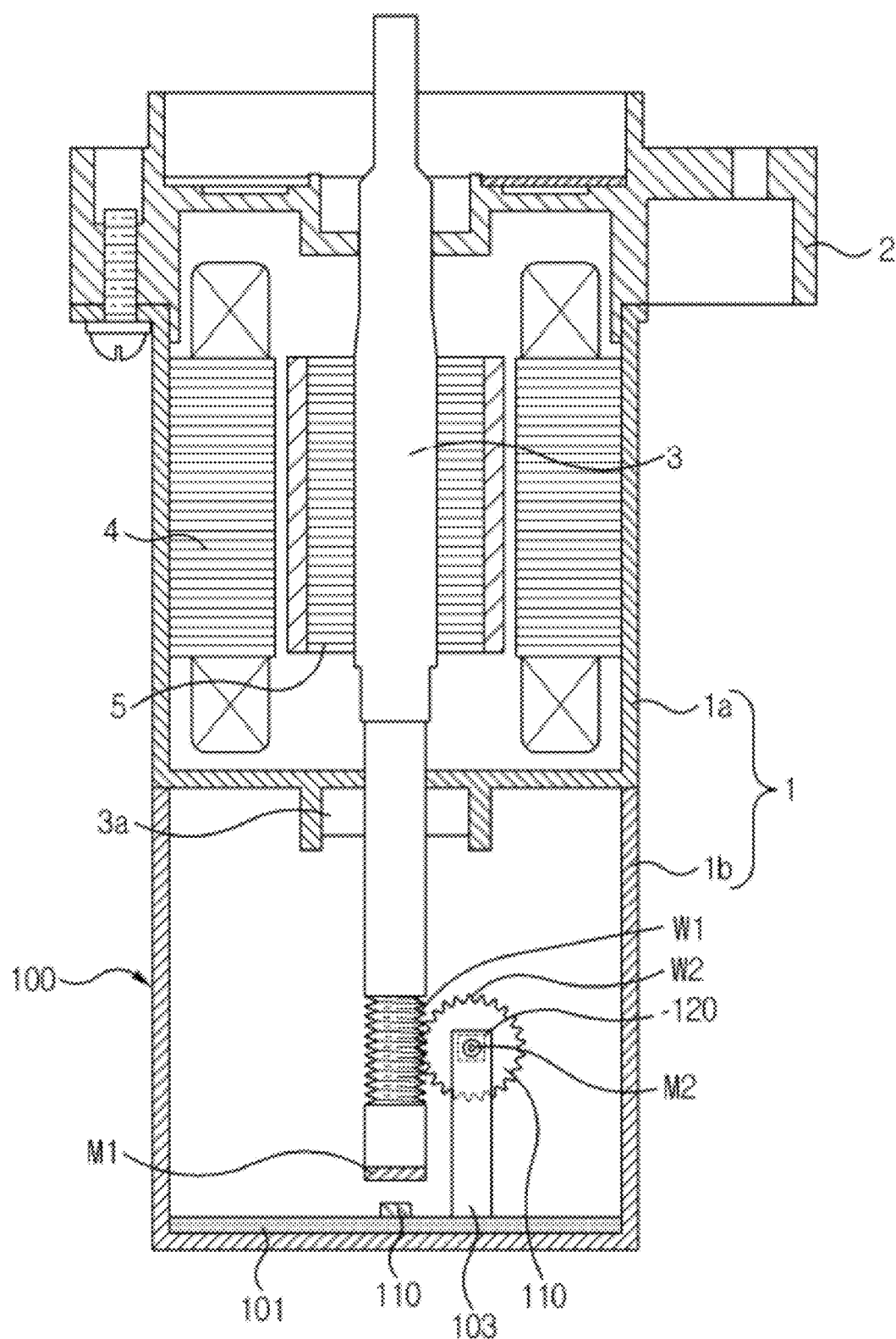
FIGS. 2 and 3 are sectional views schematically showing an EPS motor mounted to an electronic power steering system in accordance with the present invention.
Figure 3:
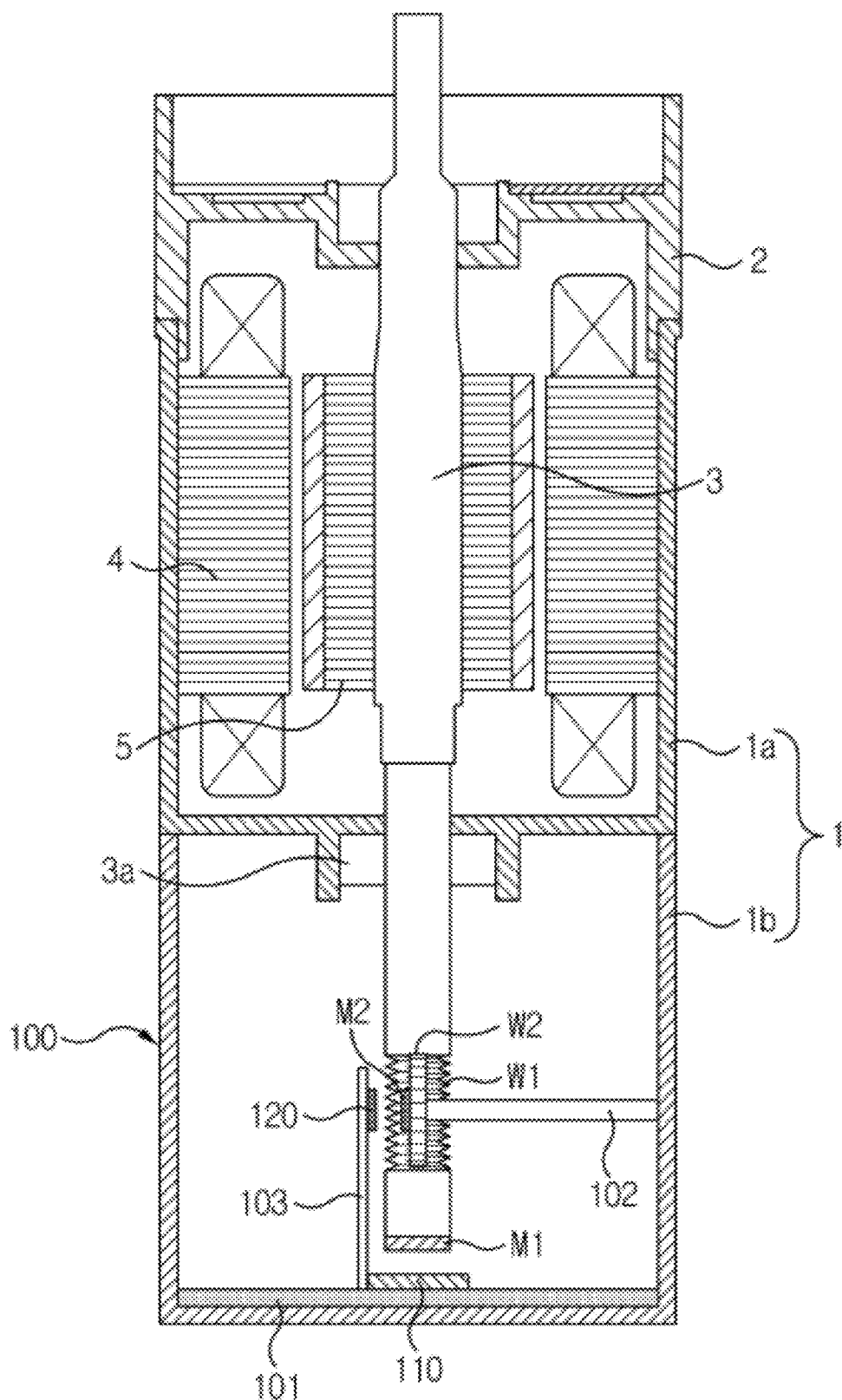

As shown in FIG. 2, the EPS motor according to the present invention includes a housing 1, a bracket 2, a rotating shaft 3, a stator 4, and a rotor 5. The housing 1 is characterized in that it is comprised of upper and lower housings 1a and 1b, and a steering angle sensor 100 is mounted to the lower housing 1b.

The upper and lower housings 1a and 1b may be integrated into a single body. Alternatively, the lower housing 1b may be provided separately from the upper housing 1a, and then may be coupled to a lower portion of the upper housing 1a.

The upper housing 1a takes a shape of a cylinder that is open at a top thereof. The stator 4 and the rotor 5 are installed in an internal space of the upper housing 1a, and the bracket 2 is coupled to an upper portion of the upper housing 1a, thus defining an external appearance of the EPS motor. Meanwhile, the rotating shaft 3 supporting the rotor 5 is installed along a central axis of the upper housing 1a to pass through a bottom surface of the upper housing 1a.

The lower housing 1b is disposed under the upper housing 1b, and the steering angle sensor 100 is installed in the lower housing 1b. A structure of the steering angle sensor 100 will be described later in more detail. As described above, the lower housing 1b takes a shape of a cylinder that is open at a top thereof, so that the lower housing 1b may be coupled to the bottom surface of the upper housing 1a, or a wall surface of the lower housing 1b may be integrated with the upper housing 1a and a bottom surface of the lower housing 1b may be coupled with a substrate 101 of the steering angle sensor 100 that will be described below.

The rotating shaft 3 is rotatably supported at both ends thereof by the upper housing 1a and the bracket 2. Preferably, a bearing 3a may be provided on a portion of the rotating shaft 3 supported by each of the upper housing 1a and the bracket 2. Further, as described above, the rotating shaft 3 is coupled to the upper housing 1a to pass through the bottom surface thereof and protrude to an outside thereof beyond a predetermined length.

The stator 4 is disposed on an inner circumference of the upper housing 1a, and is comprised of a core, a coil wound around the core, and an insulating material. Generally, a warm shrink fitting process is used to couple the stator 4 to the upper housing 1a. That is, if the upper housing 1a is heated to couple the stator 4 to the upper housing 1a, a metal material forming the upper housing 1a thermally expands, so that an inner diameter of the upper housing 1a increases. In this state, if the stator 4 is inserted into the upper housing 1a and the upper housing 1a is cooled, the upper housing 1a is shrunk and is in frictional contact with the stator 4, so that the stator 4 can be supported on the inner circumference of the upper housing 1a.

The rotor 5 is mounted to an outer circumference of the rotating shaft 3, and is disposed on a surface corresponding to the stator 4. The rotor 5 includes a core and a magnet.

Figure 1:
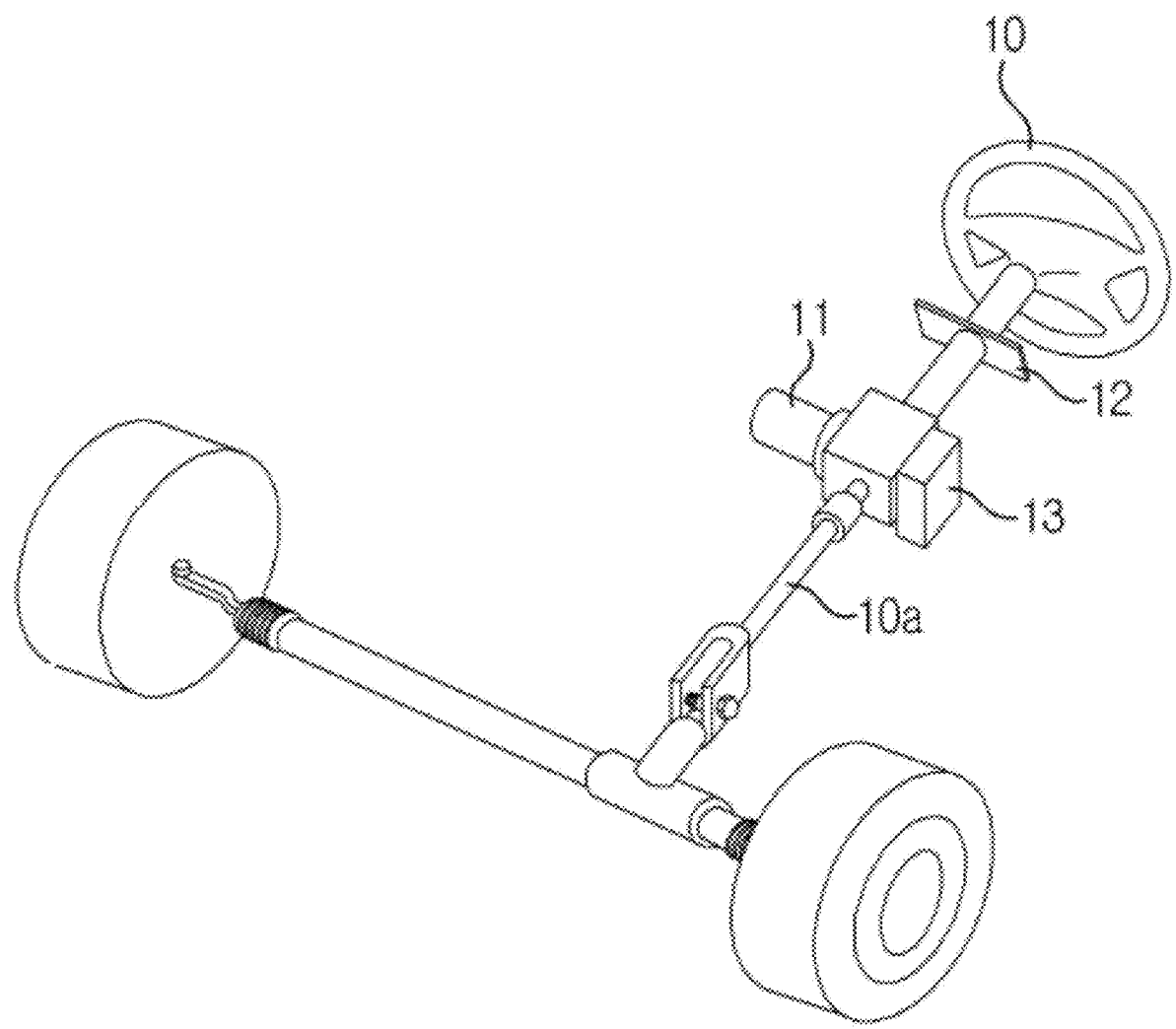
FIG. 1 is a schematic view illustrating a typical electronic power steering system.

Thus, if a current is applied to the stator 4, the rotor 5 is rotated by electromagnetic interaction between the stator 4 and the rotor 5, so that the rotating shaft 3 rotates in conjunction with the rotation of the rotor 5. Since the rotating shaft 3 is connected to the steering shaft 10a (see FIG. 1) via a reduction gear (not shown), the steering shaft 10a can also be rotated by the rotation of the rotating shaft 3. Therefore, the EPS motor assists the rotation of the steering shaft 10a that rotates in conjunction with the steering wheel 10 as a driver rotates the steering wheel 10.

The steering angle sensor 100 functions to indirectly measure a steering angle of the steering wheel 10 rotated by a driver, and preferably includes the substrate 101, a worm gear W1, a worm wheel W2, first and second magnet members M1 and M2, and first and second hall sensors 110 and 120.

The first and second hall sensors 110 and 120 are installed at the substrate 101. In the case of a structure where the lower housing 1b is coupled with the upper housing 1a, the substrate 101 is mounted on a bottom surface of the lower housing 1a. Meanwhile, in the case of a structure where the lower housing 1b is integrated with the upper housing 1a, the substrate 101 is coupled to close an opening of the lower housing 1b together with a cover means.

The worm gear W1 is formed on the outer circumference of the rotating shaft 3 protruding from the upper housing 1a.

The worm wheel W2 is installed to be rotatable by a shaft member 102 connected to a wall surface of the lower housing 1b, and engages with the worm gear Meanwhile, the EPS reduction gear (not shown) operated in conjunction with the rotating shaft 3 usually has a reduction gear ratio of 15:1. The reduction gear ratio of 15:1 means that, when the EPS motor turns 15 times, the steering wheel 10 (see FIG. 1) turns once. Thus, assuming that the steering wheel 10 turns left 2.5 times and turns right 2.5 times, so the steering wheel 10 turns 5 times in total, the EPS motor turns 75 times (5×15=75) when the steering wheel 10 turns 5 times. Therefore, a reduction gear ratio of the worm gear W1 formed on the rotating shaft 3 and the worm wheel W2 is 75:1, so that the worm wheel W2 may turn 75 times per turn of the steering wheel 10 (see FIG. 1).

The first magnet member M1 is provided on an end of the rotating shaft 3 protruding from the upper housing 1a, and the second magnet member M2 is provided on the worm wheel W2.

The first hall sensor 110 is located at a position on the substrate 101 to correspond to the first magnet member M1, and the second hall sensor 120 is located at a position on a support member 103 electrically connected to the substrate 101 to correspond to the second magnet member M2.

Therefore, the first and second hall sensors 110 and 120 detect the first and second magnet members M1 and M2, respectively. The first hall sensor 110 detects the rotation of the rotating shaft 3 supporting the rotor 5, thus detecting precise motor rotating angle information, and the second hall sensor 120 detects a multiple turn of a motor. That is, the first hall sensor 110 is used to detect the rotating angle of the rotor 5 by detecting the rotation of the rotating shaft 3, and the second hall sensor 120 is used to roughly detect the number of turns of the rotor 5.

As described above, the present invention is advantageous in that a steering angle sensor is integrally provided in a housing of an EPS motor, so that it is unnecessary to install a separate steering angle sensor, thus making it more convenient to assemble an electronic power steering system, and achieving a reduction in manufacturing cost owing to a reduction in number of parts.

While the invention has been described in its preferred embodiments with reference to the accompanying drawings, it is to be understood that the invention is not limited thereto but may be variously embodied within the scope of the following claims.

What is claimed is:

1. An EPS motor having a steering angle sensor, comprising:

an upper housing including a stator and a rotor in an internal space thereof, a bracket coupled to an upper portion thereof, and a rotating shaft coupled to the upper housing to protrude downwards therefrom; and a lower housing disposed under the upper housing to receive the steering angle sensor therein, wherein the steering angle sensor includes:
- a substrate mounted on a bottom surface of the lower housing;
- a worm gear formed on an outer circumference of the rotating shaft protruding from the upper housing;
- a worm wheel engaging with the worm gear;
- a first magnet member coupled to an end of the rotating shaft protruding from the upper housing;
- a second magnet member provided on the worm wheel;
- a first hall sensor provided at a position on the substrate corresponding to the first magnet member; and
- a second hall sensor spaced apart from the substrate by a predetermined distance, and provided at a position corresponding to the second magnet member.

2. The EPS motor as set forth in claim 1, wherein, when a steering wheel is constructed to turn five times in total and a reduction gear ratio of an EPS reduction gear operated in conjunction with the rotating shaft connected to the steering wheel is 15:1, a reduction gear ratio of the worm gear formed on the rotating shaft to the worm wheel is 75:1.

3. The EPS motor as set forth in claim 1, wherein the lower housing takes a shape of a cylinder that is open at a top thereof, and is coupled to a bottom surface of the upper housing.

4. The EPS motor as set forth in claim 1, wherein a wall surface of the lower housing is integrally formed with the upper housing, and the bottom surface of the lower housing is coupled with the substrate.

* * * * *